United States Patent
Shae et al.

(10) Patent No.: US 9,904,739 B2
(45) Date of Patent: Feb. 27, 2018

(54) SERVICE PROVIDER SYSTEM AND SERVICE PROVIDER METHOD

(71) Applicant: INSTITUTE FOR INFORMATION INDUSTRY, Taipei (TW)

(72) Inventors: Zon-Yin Shae, Taipei (TW); Chia-Hung Kao, Taitung County (TW); Chi-Hung Tsai, Taipei (TW); Wei-Lun Huang, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 637 days.

(21) Appl. No.: 14/549,561

(22) Filed: Nov. 21, 2014

(65) Prior Publication Data

US 2016/0098491 A1   Apr. 7, 2016

(30) Foreign Application Priority Data

Oct. 2, 2014 (TW) .............................. 103134424 A

(51) Int. Cl.
   G06F 15/16    (2006.01)
   G06F 17/30    (2006.01)
   (Continued)

(52) U.S. Cl.
   CPC ........ *G06F 17/30923* (2013.01); *H04L 67/16* (2013.01); *H04L 67/42* (2013.01)

(58) Field of Classification Search
   CPC .... H04L 67/42; H04L 67/16; G06F 17/30923
   (Continued)

(56) References Cited

U.S. PATENT DOCUMENTS

| 7,243,155 B2 * | 7/2007 | Bou-Ghannam ....... H04L 67/02 709/203 |
| 7,665,064 B2 * | 2/2010 | Able ................. G06F 17/30861 717/117 |

(Continued)

FOREIGN PATENT DOCUMENTS

| EP | 1465389 B1 | 3/2008 |
| WO | 2004/021220 A1 | 3/2004 |
| WO | 2013/091317 A1 | 6/2013 |

OTHER PUBLICATIONS

The office action of the corresponding Taiwan application dated Jan. 12, 2016.

*Primary Examiner* — Bharat N Barot
(74) *Attorney, Agent, or Firm* — CKC & Partners Co., Ltd.

(57) ABSTRACT

A service provider system and a service provider method are disclosed herein. The service provider system includes a service provider device and a mobile device. The mobile device includes a network module, a processing module and a storage module. The network module of the mobile device connects to the service provider device through a wireless network and receives a service description file provided by the service provider device. The processing module is configured to execute a program code stored in the storage module so as to implement a synthesizing method of an application program. The synthesizing method includes the following steps: parsing multiple service description data from the service description file; and generating an application program corresponding to the service description file according to the service description data and a resource list corresponding to the mobile device.

20 Claims, 5 Drawing Sheets

(51) Int. Cl.
  *H04L 29/06*    (2006.01)
  *H04L 29/08*    (2006.01)

(58) Field of Classification Search
  USPC .................................. 709/202–203, 217–219
  See application file for complete search history.

(56) References Cited

U.S. PATENT DOCUMENTS

| | | | | |
|---|---|---|---|---|
| 8,037,129 | B2* | 10/2011 | Schuierer | H04L 67/16 709/203 |
| 8,078,096 | B2* | 12/2011 | Rao | H04L 67/22 709/203 |
| 8,260,838 | B2* | 9/2012 | Liu | G06F 17/30861 709/201 |
| 2002/0120685 | A1* | 8/2002 | Srivastava | G06F 17/3089 709/203 |
| 2004/0128344 | A1* | 7/2004 | Trossen | H04L 67/16 709/203 |
| 2011/0083117 | A1* | 4/2011 | Vitanov | G06F 17/30861 717/106 |

* cited by examiner

SERVICE PROVIDER SYSTEM AND SERVICE PROVIDER METHOD

RELATED APPLICATIONS

This application claims priority to Taiwan Application Serial Number 103134424, filed Oct. 2, 2014, which is herein incorporated by reference.

BACKGROUND

Field of Invention

The present disclosure relates to a service provider system. More particularly, the present disclosure relates to a service provider system which uses a service description file to generate a service application program.

Description of Related Art

Recently, owing to the advancement of different devices and to the development of device to device (D2D) communication technique, assisting devices in searching for other devices or communication between devices becomes main research topics nowadays.

When a user uses an electronic device to communicate with different devices, the user is required to download and install different application programs corresponding to different devices so as to use the corresponding services. However, the requirement makes the user download too many and too complicated application programs, in which the application programs occupy a certain portion of the storage capacity of the electronic device.

Moreover, since techniques of wearable devices, e.g., smart watch, smart glasses, etc., become more mature, input modules or display modules of different types of wearable devices are different from each other. Therefore, regarding to different types of wearable devices, the user is required to download the application program corresponding to his/her wearable device, which becomes a great burden to the user.

Based on those mentioned above, there is a need to let the user use services which are provided by different devices more intuitionally and efficiently.

SUMMARY

The disclosure provides a service provider system. The service provider system includes a first service provider device and a mobile device. The first service provider device is configured to provide a service description file. The mobile device includes a network module, a processing module and a non-transitory computer-readable medium. The network module is configured to connect to the first service provider device through a wireless network and to receive a service description file provided by the first service provider device. The non-transitory computer-readable medium configured to store a program code, wherein the processing module executes the program code for performing a synthesizing method of an application program. The synthesizing method includes the following steps: parsing multiple service description data from the service description file; and generating a first application program corresponding to the service description file according to the service description data and a resource list corresponding to the mobile device, wherein the service description data is configured to describe an operating mode and an operating flow of the first application program.

The disclosure provides a service provider method. The service provider method is suitable for a first service provider device and a mobile device. The service provider method includes the following steps: receiving a service description file by the mobile device from the first service provider device; parsing multiple description data from the service description file; and generating a first application program corresponding to the service description file according to the service description data and a resource list corresponding to the mobile device, wherein the service description data is configured to describe an operating mode and an operating flow of the first application program.

From the above embodiments, the service provider system and the service provider method of the present disclosure let the user access the application program corresponding to the service provider device and the mobile device owned by the user. Furthermore, the service provider system and the service provider method of the present disclosure let the user manage application programs corresponding to different service provider devices more efficiently.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
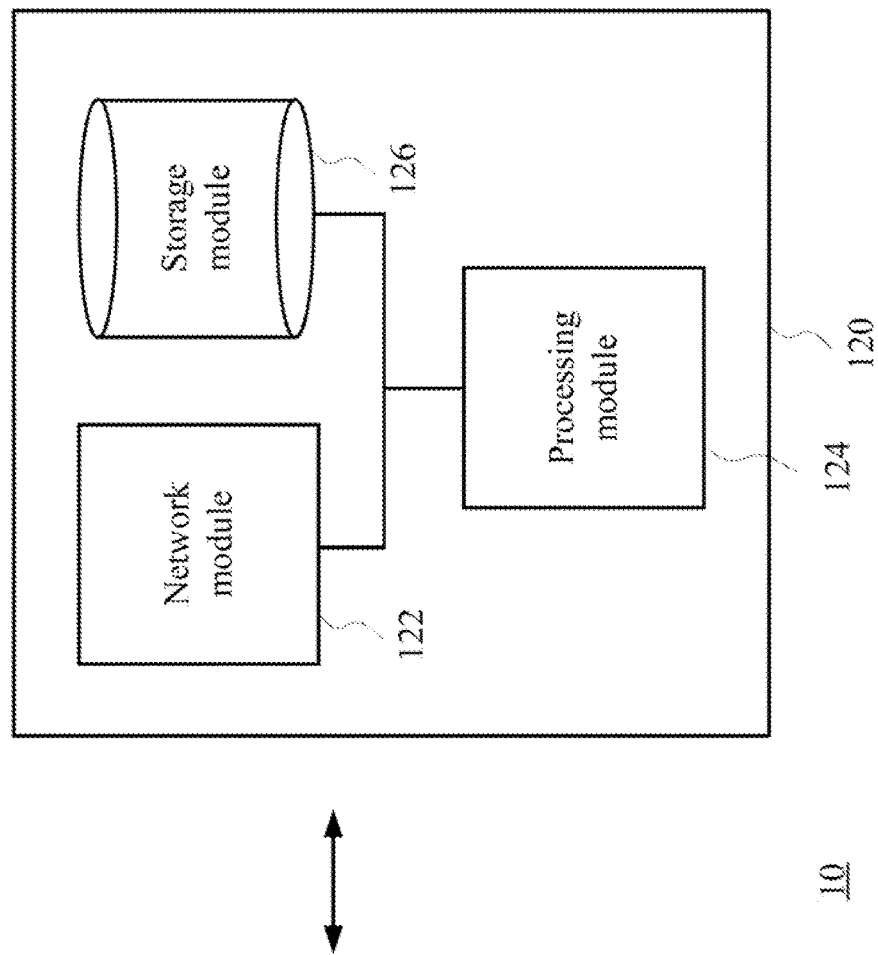
FIG. 1 is a schematic diagram illustrating a service provider system according to one embodiment of the disclosure.
Figure 1:
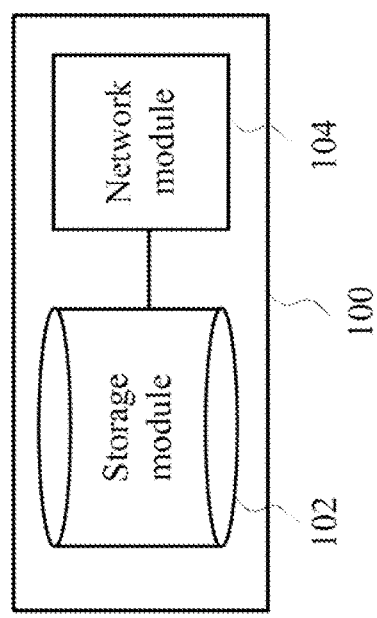

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a schematic diagram illustrating a service provider system 10 according to one embodiment of the disclosure is presented. The service provider system 10 comprises a service provider device 100 and a mobile device 120. The mobile device 120 connects to the service provider device 100 through a wireless network.

The service provider device 100 comprises a storage module 102 and a network module 104. The storage module 102 is electrically coupled to the network module 104, in which the storage module 102 is configured to store a service description file, and the network module 104 is configured to transmit the service description file to the mobile device 120. The service description file is configured to describe an operating mode and an operating flow of a service, and the service description file comprises multiple service description data corresponding to the operating mode and the operating flow.

In some embodiments, the service provider device 100 further includes a processing module (which is not shown in figures). The processing module is configured to push the service description file of the storage module 102 to the mobile device 120. For example, the service provider device 100 may be an electronic device set in a store. The electronic device is configured to push the service description file to the mobile device 120 so as to provide services, e.g., products on sale or popular products of the store.

In some embodiments, the service description file may be an eXtensible Markup Language (XML) file.

The mobile device 120 comprises a network module 122, a processing module 124 and a storage module 126. The network module 122 is configured to receive the service description file provided by the service provider device 100 through the wireless network. The storage module 126 is configured to storage a program code. The processing module 124 executes the program code so as to perform a synthesizing method of an application program. The synthesizing method includes the following steps: first, parsing description data from the service description file; and subsequently generating a first application program corresponding to the service description file according to the service description data and a resource list corresponding to the mobile device. The service description data is configured to describe an operating mode and an operating flow of the first application program, and the resource list is configured to describe software resource and hardware resource of the mobile device 120 such as the type of operating system, the type of display module and the type of input module.

As a result, the service provider device 100 of the service provider system 10 is only required to provide the service description file to make the mobile device 120 generate the corresponding first application program on its own. In addition, since the first application program is generated according to the service description data and the resource list of the mobile device 120, when another mobile device having different input interface receives the service description file provided by the service provider device 100, the another mobile device would generate another application program corresponding to the service description file.

In some embodiments, the service description file includes a first tag, and the storage module 126 is further configured to store at least one second application program, in which the second application program includes a second tag. After the network module 122 receives the service description file, the processing module 124 is further configured to compare the first tag of the service description file and the second tag of the second application program. If the first tag of the service description file and the second tag of the second application program are different tags, the processing module 124 further parses multiple service description data from the service description file and generates the first application program according to the service description data. On the other hand, if the tag of the service description file and the tag of the second application program are the same tag, the processing module 124 configures the first application program to be the second application program. In other words, if the tag of the service description file and the tag of the second application program are the same tag, the processing module 124 does not regenerate the first application program according to the service description file.

In some embodiments, the resource list recites software resource and hardware resource of the mobile device. For example, the software resource may be an operating system of the mobile device 120. For example, the operating system may be Android system, IOS system or WP system. On the other hand, the hardware resource may be an input module, a display module and other modules of the mobile device 120. For example, if the mobile device 120 is a smart watch, the input module may be a touch panel module. If the mobile device 120 is a smart glass (e.g., Google glass), the input module may be a voice control module.

In some embodiments, the first application program is configured to use a service, in which the service is provided by the service provider device 100, or the service is provided by another service provider device (not shown in figures). For example, the another service provider device may be a cloud device. In other words, the location which provides the service description file and the location which provides the service may be different locations.

Figure 2:
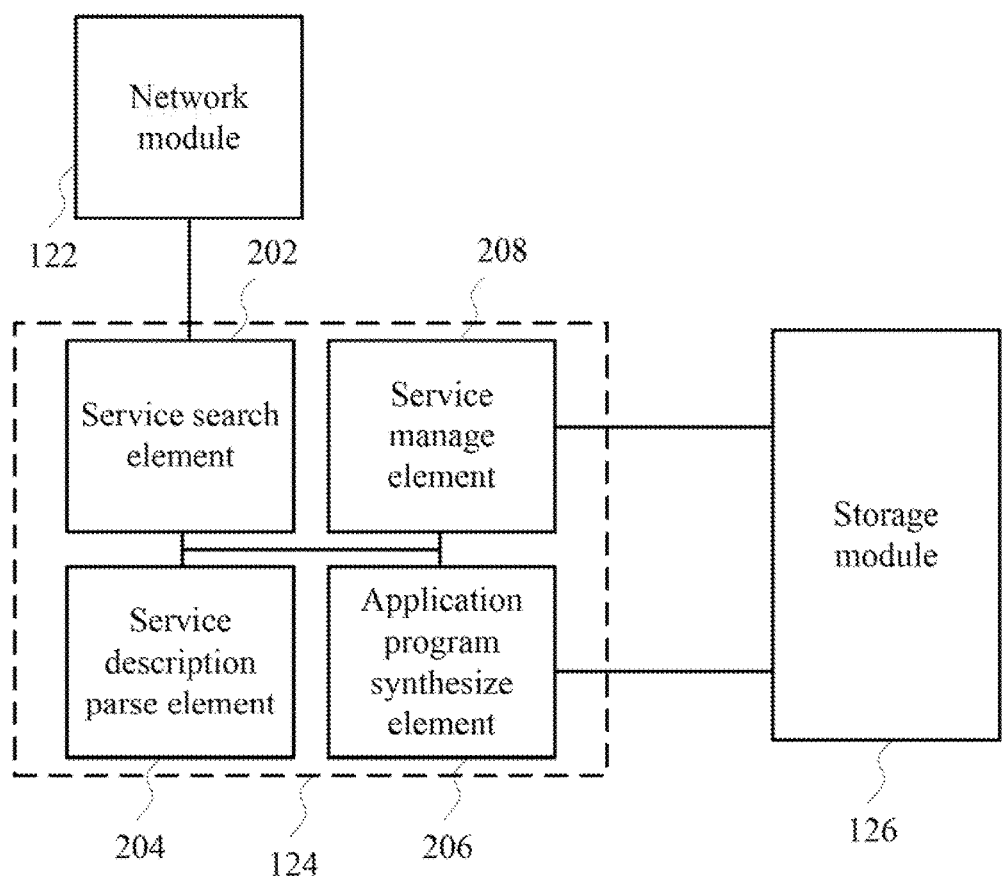
FIG. 2 is a schematic diagram illustrating a mobile device according to one embodiment of the disclosure.

Reference is also made to FIG. 2 so as to further illustrate the functions after the processing module 124 loads the program code. FIG. 2 is a schematic diagram illustrating a mobile device 200 according to one embodiment of the disclosure. Compared to the mobile device 120 shown in FIG. 1, the processing module 124 of the mobile device 200 includes a service search element 202, a service description parse element 204, an application program synthesize element 206 and a service description manage element 208, in which the processing module 124 loads and executes the program code stored in the storage module 126 so as to provide the corresponding functions of the service search element 202, the service description parse element 204, the application program synthesize element 206 and the service description manage element 208.

The search element 202 is configured to control the network module 122 so as to search service provider device 100 located in the surrounding area.

The service description element 204 is configured to parse multiple service description data from the service description file.

The application program synthesize element 206 is configured to generate the first application program according to the resource list stored in the storage module 126 and the service description data parsed by the service description parse element 204.

The service manage element 208 is configured to compare the first tag of the service description file and the second tag of the second application program stored in the storage module 126.

Figure 3:
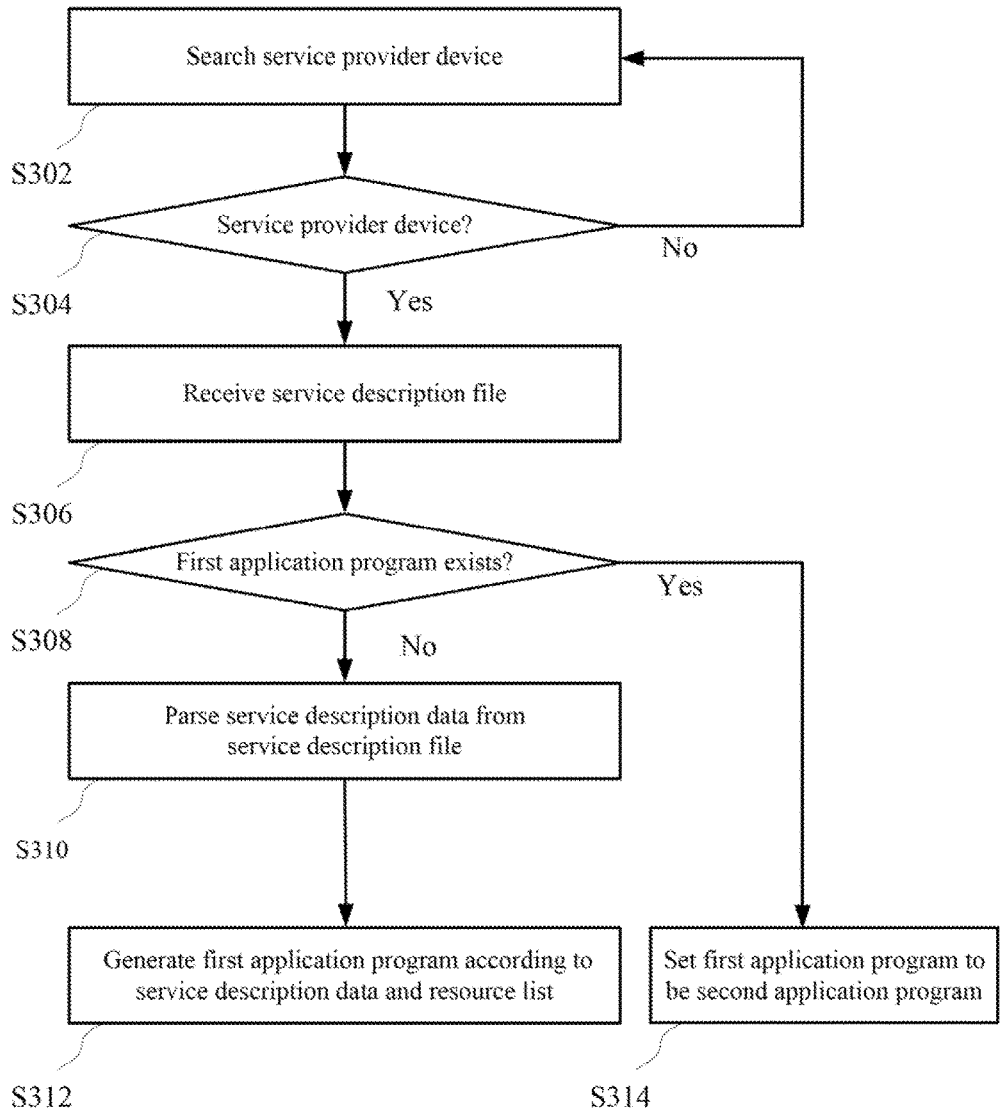
FIG. 3 is a flow diagram illustrating a service provider method according to one embodiment of the disclosure.

Reference is also made to FIG. 3 so as to illustrate the complete flow of the service provider method 300. The service provider method 300 is suitable for the service provider system 10 shown in FIG. 1.

First, in step S302, the mobile device 120 searches the service provider device 100 in the surrounding area.

In step S304, if the mobile device 120 searches a service provider device 100 and confirms that the service provider device 100 is the provider of the service description file, the flow of the service provider method 300 goes to step S306. Otherwise, the service provider method 300 goes back to step S302 so to continually search for the service provider device 100 that is the provider of the service description file.

In step S306, the network module 122 of the mobile device 120 receives the service description file provided by the service provider device 100.

In step S308, the processing module 124 of the mobile device 120 compares the first tag of the service description file and the second tag of the second application program. If the first tag of the service description file and the second tag of the second application program are different, the flow of the service provider method 300 goes to step S310. On the other hand, if the first tag of the service description file and the second tag of the second application program are the same, the flow of the service provider method 300 goes to step S314, which makes the processing module 124 set the first application program to be the second application program. In more details, the first application program is configured as the second application program stored in the storage module 126, which reduces the computation cost and time of re-synthesizing the first application program by the processing module 124. In other words, if the tag of the service description file and the tag of the second application program are the same tag, the processing module 124 does not regenerate the first application program according to the service description file.

In step S310, the processing module 124 of the mobile device 120 parses multiple service description data from the service description file.

In step S312, the processing module 124 generates the first application program corresponding to the service description file according to the service description data and the resource list of the mobile device 120.

In some embodiments, the service provider method 300 may take the form of a computer program product stored on a computer-readable storage medium, which makes the computer read the computer-readable storage medium so as to execute the service provider method. Any suitable storage medium (such as non-transitory medium) may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

Based on those mentioned above, the service provider system 10 and the service provider method 300 of the present disclosure let the user access the application program corresponding to the service provider device 100 and the mobile device 120 more conveniently. Moreover, the service provider system 10 and the service provider method 300 of the present disclosure prevent the user from generating the repetitive and redundant application programs.

Figure 4:
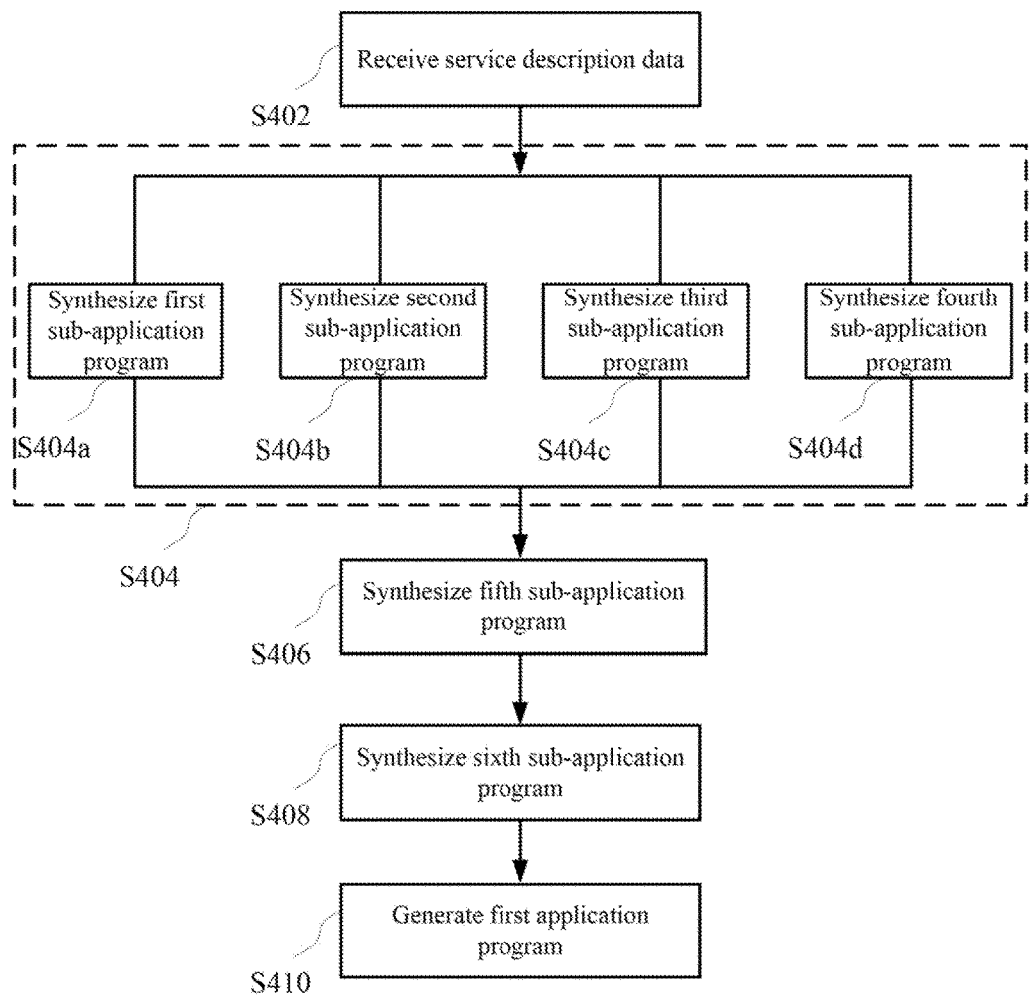
FIG. 4 is a flow diagram illustrating an synthesizing method according to one embodiment of the disclosure.

Referring to FIG. 4, a flow diagram illustrating a synthesizing method 400 according to one embodiment of the disclosure is presented. The synthesizing method 400 further illustrates the step S312 shown in FIG. 3. The synthesizing method 400 is executed by the processing module 124 of the mobile device 120. In more details, the synthesizing method 400 is executed by the application program synthesize element 206 of the processing module 124.

It should be noted that the service description data comprises a first service description data corresponding to the interface layout. The first service description data is configured to describe allocation of objects displayed on the screen, such as allocation of images and texts for the user interface. The processing module 124 generates the interface layout based on the first service description data.

The service description data comprises a second service description data corresponding to the service invocation. The second service description data is configured to describe the location where service is provided. As shown previously, the location of the service may lie in a cloud device or in a specific website. For example, when the service description data is an XML file, and when the location providing the service is a service provider, the service description data is shown as follow:

```
<ServiceProviders>
<Service id="API-1" url="http://ari.iii.org.tw/TVControl">
<Parameters>
<type>slider</type>
<name>channel</name>
</Parameters>
. . .
</Service>
. . .
</ServiceProviders>
```

The website address "http://ari.iii.org.tw/TVControl" is the location providing the service. After the processing module 124 parses the second description data, i.e., <Service id="API-1" url="http://ari.iii.org.tw/TVControl">, the processing module 124 accesses the location of the service, i.e., website address: http://ari.iii.org.tw/TVControl.

The service description data comprises a third service description data corresponding to an user interaction. The third service description data is configured to define input commands which are required by the service. For example, if the service requires the user to select a specific product, the third service description data defines the operation of selection such as touching on a picture corresponding to the specific product, filling a blank corresponding to the specific product or uttering a voice code corresponding to the specific product. The processing module 124 defines the user interaction required by the service based on the third service description data. For example, the third service description data may be shown as below:

```
<Interactions>
<ButtonEvent ui-component="button-1" event="onClick">
<Fetch api="API-1" />
<Display A />
</Fetch>
</ButtonEvent>
</Interactions>
```

The third service description data defines that "A" is displayed when "onClick" takes place on "button-1".

The service description data comprises a fourth service description data corresponding to a hardware resource control. The fourth service description data is configured to define the hardware resource which is required by the service. For example, the service requires a display panel or a micro projector so as to display the specific product provided by the service, and the processing module 124 would control the hardware resource according to the fourth service description data.

Referring back to FIG. 4, in step S402, the application program synthesize element 206 receives the multiple service description data generated by the service description parse element 204.

In step S404, the application program synthesize element 206 generates the corresponding sub-application programs according to the service description data, in which the step S404 includes sub step S404a, sub step S404b, sub step S404c and sub step S404d which could be processed in parallel.

In sub step S404a, the application program synthesize element 206 generates a first sub-application program according to the first service description data corresponding to the interface layout and the resource list.

In sub step S404b, the application program synthesize element 206 generates a second sub-application program according to the second service description data corresponding to the service invocation.

In sub step S404c, the application program synthesize element 206 generates a third sub-application program according to the third service description data corresponding to the user interaction and the resource list.

In sub step S404d, the application program synthesize element 206 generates a fourth sub-application program according to the fourth service description data and the resource list, in which the fourth service description data corresponds to the hardware resource control.

Subsequently, when the first sub-application program, the second sub-application program, the third sub-application program and the fourth sub-application program are completely generated, the flow of the synthesizing method 400 goes to step S406. In addition, the service description data also comprises a fifth description data corresponding to an operating mode (e.g., a component controller which controls the first sub-application program, the second sub-application program, the third sub-application program and the fourth sub-application program) and the sixth description data corresponding to an operating flow.

In step S406, the application program synthesize element 206 synthesizes a fifth sub-application program according to the first sub-application program, the second sub-application program, the third sub-application program, the fourth sub-application program and the fifth service description data.

In step S408, the application program synthesize element 206 synthesizes a sixth sub-application program according to the first sub-application program, the second sub-application program, the third sub-application program, the fourth sub-application program, the fifth sub-application program and the sixth service description data.

In step S410, the application program synthesize element 206 synthesizes the first application program according to the first sub-application program, the second sub-application program, the third sub-application program, the fourth sub-application program, the fifth sub-application program and the sixth sub-application program.

Figure 5:
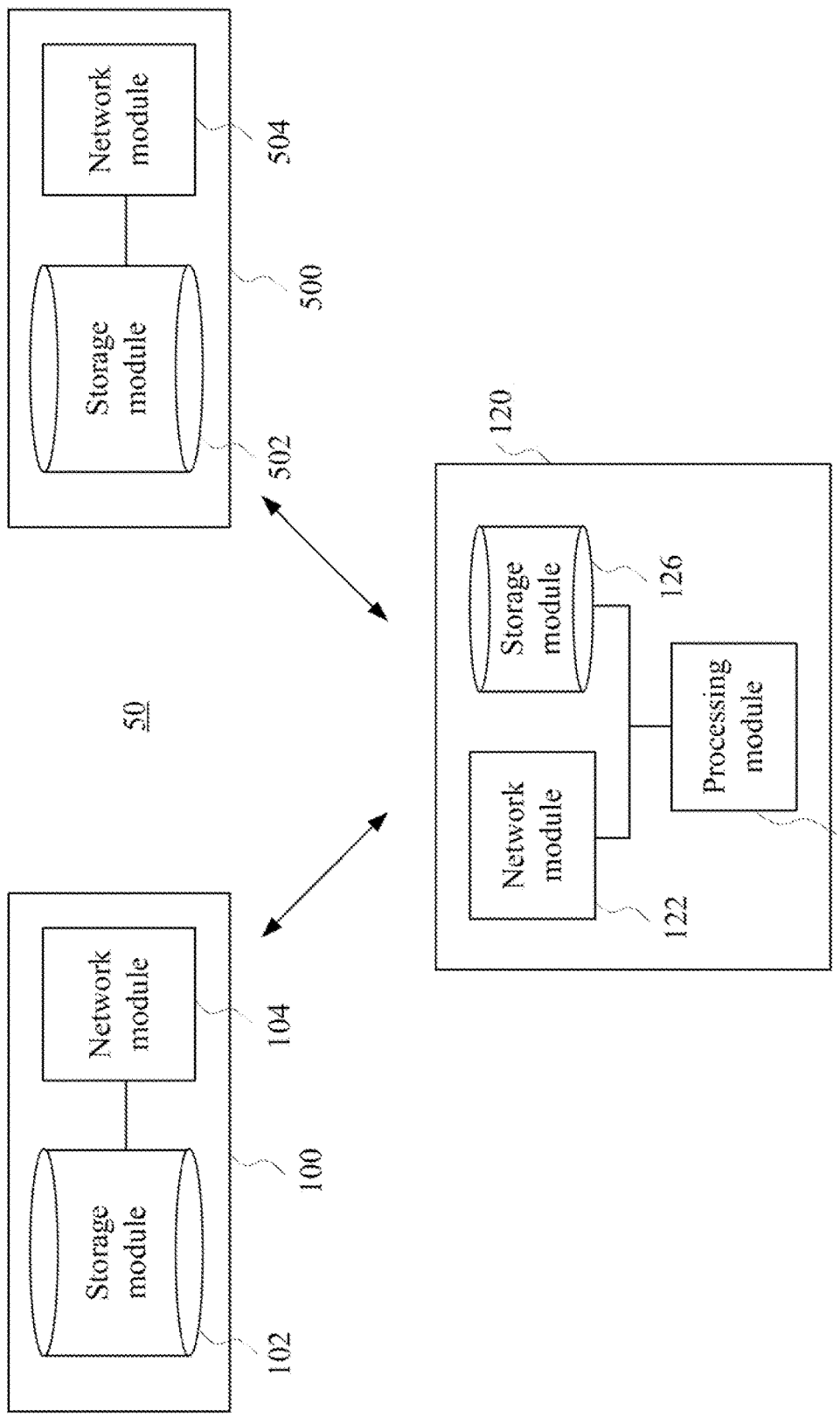
FIG. 5 is a schematic diagram illustrating a service provider system according to one embodiment of the disclosure.

Reference is made to FIG. 5 so as to illustrate that a service provider device providing the service description file and a service provider service providing the corresponding service could be the different service provider devices. FIG. 5 is a schematic diagram illustrating a service provider system 50 according to one embodiment of the disclosure. The service provider system 50 comprises the service provider device 100, a service provider device 500 and the mobile device 120. The service provider device 500 comprises a storage module 502 and a network module 504.

The service provider device 100 is configured to provide the service description file to the mobile device 120 such that the mobile device 120 could synthesize the first application program, and the service provider device 500 is configured to provide a service, in which the service corresponds to the service description data transmitted by the service provider device 100.

In all of the embodiments mentioned above, the processing module 124 may be a central processing unit (CPU), a control unit, a microprocessor or another hardware element which could execute computer readable commands.

Based on the embodiments mentioned above, the service provider system and the service provider method of the present disclosure let the user access application program corresponding to different devices. Moreover, the service provider system and the service provider method of the present disclosure prevent the user from generating the repetitive and redundant application programs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this invention provided they fall within the scope of the following claims

What is claimed is:
1. A service provider system, comprising:
  a first service provider device, configured to provide a service description file; and
  a mobile device, comprising:
    a network module, configured to connect to the first service provider device through a wireless network and to receive a service description file provided by the first service provider device;
    a processing module; and
    a non-transitory computer-readable medium configured to store a program code, wherein the processing module executes the program code for performing a synthesizing method of an application program, wherein the synthesizing method comprises:
      parsing multiple service description data from the service description file; and
      generating a first application program corresponding to the service description file according to the service description data and a resource list corresponding to the mobile device, wherein the service description data is configured to describe an operating mode and an operating flow of the first application program.

2. The service provider system of claim 1, further comprising:
  a second service provider device, configured to provide a service corresponding to the service description data to the mobile device, in which the first service provider device and the second service provider device are a same service provider device or different service provider devices.

3. The service provider system of claim 1, wherein the service description data comprises a first service description data corresponding to an interface layout, a second description data corresponding to a service invocation, a third service description data corresponding to a user interaction and a fourth service description data corresponding to a hardware resource control.

4. The service provider system of claim 3, wherein the first application program comprises a first sub-application program, a second sub-application program, a third sub-application program and a fourth sub-application program, and the step of generating the first application program comprises:
  generating the first sub-application program according to the first service description data corresponding to the interface layout and the resource list;
  generating the second sub-application program according to the second service description data corresponding to the service invocation;
  generating the third sub-application program according to the third service description data corresponding to the user interaction and the resource list; and
  generating the fourth sub-application program according to the fourth description data corresponding to the hardware resource control and the resource list.

5. The service provider system of claim 4, wherein the service description data further comprises a fifth description data corresponding to the operating mode and a sixth service description data corresponding to the operating flow.

6. The service provider system of claim 5, wherein the first application program further comprises a fifth sub-application program and a sixth sub-application program, and the step of generating the first application program further comprises:
   synthesizing the fifth sub-application program corresponding to operating mode according to the first sub-application program, the second sub-application program, the third sub-application program, the fourth sub-application program and the fifth service description data; and
   synthesizing the sixth sub-application program corresponding to the operating flow according to the first sub-application program, the second sub-application program, the third sub-application program, the fourth sub-application program, the fifth sub-application program and the sixth service description data.

7. The service provider system of claim 1, wherein the service description data comprises a first tag, the storage module of the mobile device is further configured to store at least one second application program, the second application program comprises a second tag, and the step of parsing the service description data from the service description file further comprises:
   comparing the first tag and the second tag; and
   parsing the service description data from the service description file if the first tag is different from the second tag.

8. The service provider system of claim 7, wherein the synthesizing method further comprises:
   setting the first application program to be the second application program corresponding to the second tag if the first tag and the second tag are same.

9. The service provider system of claim 1, wherein the service description data is an XML file.

10. The service provider system of claim 1, wherein the resource list comprises operating environment and hardware resource of the mobile device.

11. A service provider method, suitable for a first service provider device and a mobile device, wherein the service provider method comprises:
   receiving a service description file by the mobile device from the first service provider device;
   parsing a plurality of description data from the service description file; and
   generating a first application program corresponding to the service description file according to the service description data and a resource list corresponding to the mobile device, wherein the service description data is configured to describe an operating mode and an operating flow of the first application program.

12. The service provider method of claim 11, further comprising:
   providing a service corresponding to the service description data to the mobile device by a second service provider device, in which the first service provider device and the second service provider device are a same service provider device or different service provider devices.

13. The service provider method of claim 11, wherein the service description data comprises a first service description data corresponding to a interface layout, a second description data corresponding to a service invocation, a third service description data corresponding to a user interaction and a fourth service description data corresponding to a hardware resource control.

14. The service provider method of claim 13, wherein the first application program comprises a first sub-application program, a second sub-application program, a third sub-application program and a fourth sub-application program, and the step of generating the first application program comprises:
   generating the first sub-application program according to the first service description data corresponding to the interface layout and the resource list;
   generating the second sub-application program according to the second service description data corresponding to the service invocation;
   generating the third sub-application program according to the third service description data corresponding to the user interaction and the resource list; and
   generating the fourth sub-application program according to the fourth description data corresponding to the hardware resource control and the resource list.

15. The service provider method of claim 14, wherein the service description data further comprises a fifth description data corresponding to the operating mode and a sixth service description data corresponding to the operating flow.

16. The service provider method of claim 15, wherein the first application program further comprises a fifth sub-application program and a sixth sub-application program, and the step of generating the first application program further comprises:
   synthesizing the fifth sub-application program corresponding to operating mode according to the first sub-application program, the second sub-application program, the third sub-application program, the fourth sub-application program and the fifth service description data; and
   synthesizing the sixth sub-application program corresponding to the operating flow according to the first sub-application program, the second sub-application program, the third sub-application program, the fourth sub-application program, the fifth sub-application program and the sixth service description data.

17. The service provider method of claim 11, wherein the service description data comprises a first tag, the mobile device is further configured to store at least one second application program, the second application program comprises a second tag, and the step of parsing the service description data from the service description file further comprises:
   comparing the first tag and the second tag; and
   parsing the service description data from the service description file if the first tag is different from the second tag.

18. The service provider method of claim 17, wherein the service provider method further comprises:
   setting the first application program to be the second application program corresponding to the second tag if the first tag and the second tag are the same.

19. The service provider method of claim 11, wherein the service description data is an XML file.

20. The service provider method of claim 11, wherein the resource list comprises operating environment and hardware resource of the mobile device.

* * * * *